United States Patent
Lee et al.

(10) Patent No.: US 10,389,495 B2
(45) Date of Patent: Aug. 20, 2019

(54) METHOD SUPPORTING D2D COMMUNICATION AND APPARATUS THEREFOR IN WIRELESS COMMUNICATION SYSTEM

(71) Applicant: LG Electronics Inc., Seoul (KR)

(72) Inventors: Seungmin Lee, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 15/328,768

(22) PCT Filed: Aug. 3, 2015

(86) PCT No.: PCT/KR2015/008089
§ 371 (c)(1),
(2) Date: Jan. 24, 2017

(87) PCT Pub. No.: WO2016/018132
PCT Pub. Date: Feb. 4, 2016

(65) Prior Publication Data
US 2017/0214497 A1   Jul. 27, 2017

Related U.S. Application Data

(60) Provisional application No. 62/038,846, filed on Aug. 19, 2014, provisional application No. 62/031,883, filed on Aug. 1, 2014.

(51) Int. Cl.
| | | |
|---|---|---|
| *H04W 72/04* | (2009.01) | |
| *H04L 1/18* | (2006.01) | |
| *H04L 5/00* | (2006.01) | |
| *H04L 5/14* | (2006.01) | |
| *H04W 92/16* | (2009.01) | |
| *H04W 76/14* | (2018.01) | |
| *H04L 12/28* | (2006.01) | |

(52) U.S. Cl.
CPC .............. *H04L 1/1893* (2013.01); *H04L 1/18* (2013.01); *H04L 1/1812* (2013.01);
(Continued)

(58) Field of Classification Search
CPC ..... H04L 12/2854; H04L 1/18; H04L 1/1812; H04L 1/1893; H04L 5/0055;
(Continued)

(56) References Cited

U.S. PATENT DOCUMENTS

| | | |
|---|---|---|
| 2011/0116530 A1 | 5/2011 | Sambhwani |
| 2013/0114575 A1 | 5/2013 | Fu et al. |

(Continued)

OTHER PUBLICATIONS

Samsung: "Remaining Issues on concurrent transmission of SRI and CA ACK/NACK", 3GPP TSG RAN WG1 #63bis, R1-110081, Jan. 17-21, 2011.

(Continued)

*Primary Examiner* — Robert J Lopata
(74) *Attorney, Agent, or Firm* — Dentons US LLP

(57) ABSTRACT

The present invention relates to a method for transmitting an hybrid automatic repeat request acknowledgement/negative-acknowledgement (HARQ-ACK/NACK) on the basis of a wide area network (WAN) of a device-to-device (D2D) terminal in a time division duplex (TDD)-based wireless communication system. Specifically, the method comprises the steps of: receiving a downlink HARQ reference configuration for WAN communication; and transmitting a HARQ-ACK/NACK from a downlink HARQ reference configuration-based first uplink subframe, wherein the first uplink subframe is an uplink subframe configured so as to communicate only via WAN.

9 Claims, 12 Drawing Sheets

(52) U.S. Cl.
CPC .......... *H04L 5/0055* (2013.01); *H04L 5/0092* (2013.01); *H04L 5/1469* (2013.01); *H04W 72/0413* (2013.01); *H04W 72/0446* (2013.01); *H04W 92/16* (2013.01); *H04L 5/1438* (2013.01); *H04L 12/2854* (2013.01); *H04W 76/14* (2018.02)

(58) Field of Classification Search
CPC ... H04L 5/0092; H04L 5/1438; H04L 5/1469; H04W 72/0413; H04W 72/0446; H04W 76/14; H04W 92/16; H04B 7/26
USPC .......................................................... 370/280
See application file for complete search history.

(56) References Cited

U.S. PATENT DOCUMENTS

| | | | | |
|---|---|---|---|---|
| 2013/0322413 | A1* | 12/2013 | Pelletier | H04W 72/1289 370/336 |
| 2013/0336299 | A1* | 12/2013 | Lee | H04L 5/0007 370/336 |
| 2014/0092824 | A1* | 4/2014 | He | H04W 4/70 370/329 |
| 2014/0269338 | A1* | 9/2014 | Jung | H04L 5/0055 370/241 |
| 2015/0173065 | A1* | 6/2015 | Fu | H04L 1/1861 370/280 |
| 2016/0255489 | A1* | 9/2016 | Seo | H04W 76/14 370/329 |
| 2016/0309502 | A1* | 10/2016 | Seo | H04L 1/1861 |
| 2017/0105198 | A1* | 4/2017 | Fu | H04L 5/00 |
| 2017/0150340 | A1* | 5/2017 | Park | H04W 76/14 |
| 2019/0098484 | A1* | 3/2019 | Park | H04W 74/0833 |

OTHER PUBLICATIONS

ZTE: "Reference configuration in TDD-eIMTA HARQ timing", 3GPP TSG RAN WG1 Meeting #74bis, R1-134315, Oct. 7-11, 2013.

LG Electronics: "Multiplexing of Uu and D2D communication", 3GPP TSG RAN WG1 Meeting #76, R1-140335, Feb. 10-14, 2014.

* cited by examiner

FIG. 2
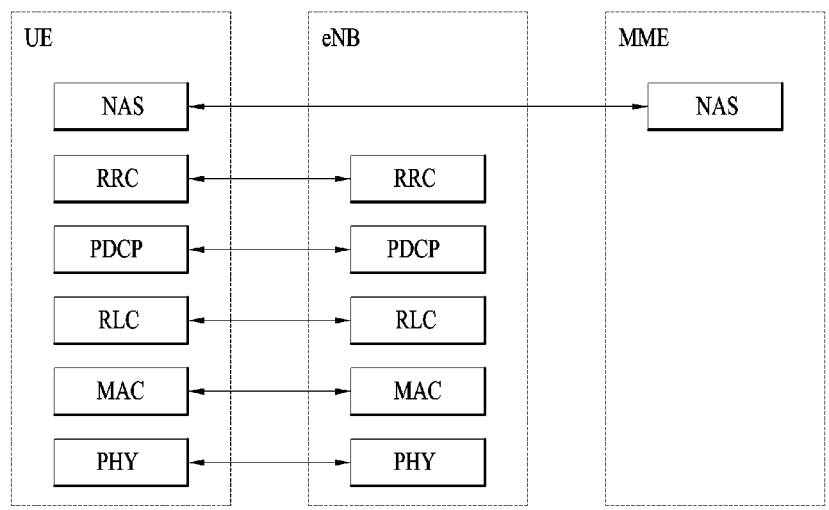
(a) Control-plane protocol stack
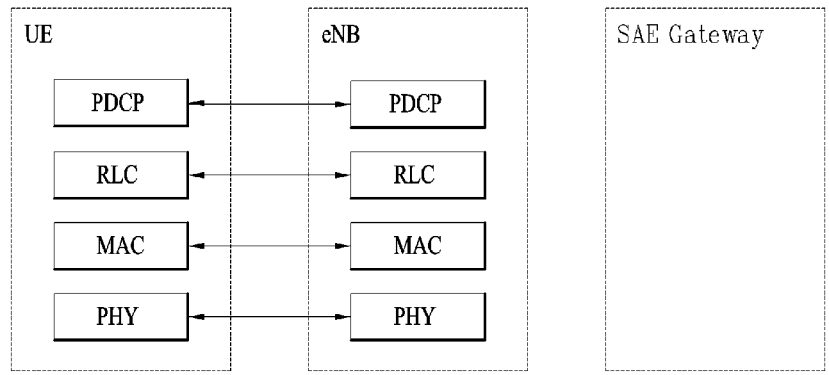
(b) User-plane protocol stack FIG. 8
(a) 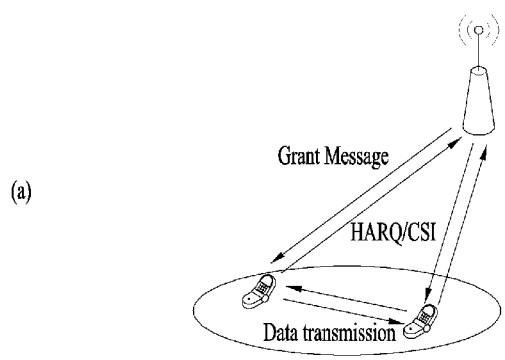
(b) 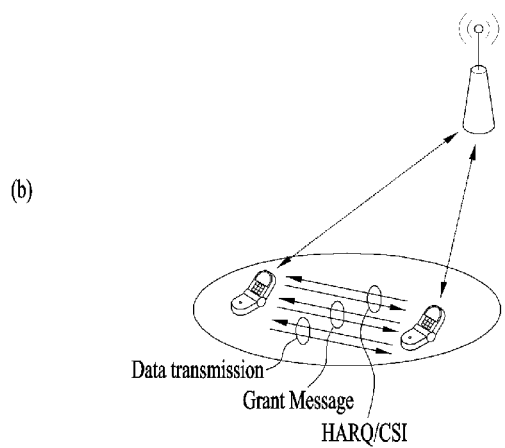

METHOD SUPPORTING D2D COMMUNICATION AND APPARATUS THEREFOR IN WIRELESS COMMUNICATION SYSTEM

This application is a 35 USC § 371 National Stage entry of International Application No. PCT/KR2015/008089, filed on Aug. 3, 2015, and claims priority to U.S. Provisional Application Nos. 62/038,846, filed Aug. 19, 2014, and 62/031,883, filed Aug. 1, 2014, which are hereby incorporated by reference in their entireties for all purposes as if fully set forth herein.

TECHNICAL FIELD

The present invention relates to a wireless communication system, and more particularly, to a method for supporting device-to-device (D2D) communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The UE reports state information of a current channel to the eNB periodically and/or aperiodically to assist the eNB to efficiently manage the wireless communication system. Since the reported channel state information may include results calculated in consideration of various situations and accordingly, a more efficient reporting method is needed.

DISCLOSURE OF THE INVENTION

Technical Task

Based on the above-described discussion, a method for supporting device-to-device (D2D) communication in a wireless communication system and apparatus therefor are proposed in the present invention.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first aspect of the present invention, provided herein is a method for transmitting a hybrid automatic repeat request acknowledgement/negative-acknowledgement (HARQ-ACK/NACK) based on a wide area network (WAN) in a wireless communication system based on time division duplex (TDD), the method performed by a device-to-device (D2D) user equipment (UE) and including: receiving a downlink HARQ reference configuration for WAN communication; and transmitting the HARQ-ACK/NACK in a first uplink subframe based on the downlink HARQ reference configuration, wherein the first uplink subframe may be an uplink subframe configured for only the WAN communication.

Additionally, a bit size of the HARQ-ACK/NACK may be determined according to the number of valid downlink subframes determined according to the downlink HARQ reference configuration and an uplink-downlink configuration based on a system information block (SIB) and the valid downlink subframes may be subframes configured as downlink subframes in both of the downlink HARQ reference configuration and the uplink-downlink configuration based on the SIB.

Additionally, a physical uplink control channel (PUCCH) resource for the HARQ-ACK/NACK may be determined according to the number of valid downlink subframes determined according to the downlink HARQ reference configuration and an uplink-downlink configuration based on a system information block (SIB) and the valid downlink subframes may be subframes configured as downlink subframes in both of the downlink HARQ reference configuration and the uplink-downlink configuration based on the SIB.

Additionally, a maximum number of downlink HARQ processes for the HARQ-ACK/NACK may be determined according to an uplink-downlink configuration based on a system information block (SIB).

In a second aspect of the present invention, provided is a method for feeding back a hybrid automatic repeat request acknowledgement/negative-acknowledgement (HARQ-ACK/NACK) based on a wide area network (WAN) in a wireless communication system based on frequency division duplex (FDD), the method performed by a device-to-device (D2D) user equipment (UE) and including: receiving a signal indicating that subframe bundling is enabled; and performing bundling of an HARQ-ACK/NACK in a first uplink subframe configured for D2D communication and an HARQ-ACK/NACK in a second uplink subframe configured for WAN communication, wherein only when valid control information is received in a last downlink subframe within a predetermined bundling window, the bundled HARQ-ACK/NACK may be fed back.

In a third aspect of the present invention, provided is a method for feeding back a hybrid automatic repeat request acknowledgement/negative-acknowledgement (HARQ-ACK/NACK) based on a wide area network (WAN) in a wireless communication system based on frequency division duplex (FDD), the method performed by a device-to-device (D2D) user equipment (UE) and including: receiving a downlink HARQ reference configuration based on time division duplex (TDD); and performing HARQ-ACK/NACK feedback of a physical downlink shared channel (PDSCH) received in a downlink subframe corresponding to uplink subframe timing in the downlink HARQ reference configuration based on the TDD, wherein the HARQ-ACK/NACK feedback may comply with FDD downlink HARQ timing.

Additionally, a resource pool for D2D communication may be configured with only uplink subframes that match the FDD downlink HARQ timing among uplink subframes in the downlink HARQ reference configuration based on the TDD.

Additionally, on the resource pool for the D2D communication, time division multiplexing (TDM) of HARQ timing based on the downlink HARQ reference configuration based on the TDD and the FDD downlink HARQ timing may be configured to be performed.

In a fourth aspect of the present invention, provided is a device-to-device (D2D) user equipment (UE) for performing hybrid automatic repeat request acknowledgement/negative-acknowledgement (HARQ-ACK/NACK) transmission based on a wide area network (WAN) in a wireless communication system based on time division duplex (TDD), including: a radio frequency unit; and a processor, wherein the processor may be configured to receive a downlink HARQ reference configuration for WAN communication and transmit an HARQ-ACK/NACK in a first uplink subframe based on the downlink HARQ reference configuration and wherein the first uplink subframe may be an uplink subframe configured for only the WAN communication.

In a fifth aspect of the present invention, provided is a device-to-device (D2D) user equipment (UE) for performing hybrid automatic repeat request acknowledgement/negative-acknowledgement (HARQ-ACK/NACK) feedback based on a wide area network (WAN) in a wireless communication system based on frequency division duplex (FDD), including: a radio frequency unit; and a processor, wherein the processor may be configured to receive a downlink HARQ reference configuration based on time division duplex (TDD) and perform HARQ-ACK/NACK feedback of a physical downlink shared channel (PDSCH) received in a downlink subframe corresponding to uplink subframe timing in the downlink HARQ reference configuration based on the TDD and wherein the HARQ-ACK/NACK feedback may comply with FDD downlink HARQ timing.

Advantageous Effects

According to embodiments of the present invention, it is possible to efficiently support D2D communication in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a user equipment and E-UTRAN based on 3GPP radio access network standards.

FIG. 8 is a reference diagram for explaining D2D (UE-to-UE) communication.

BEST MODE FOR INVENTION

Figure 1:
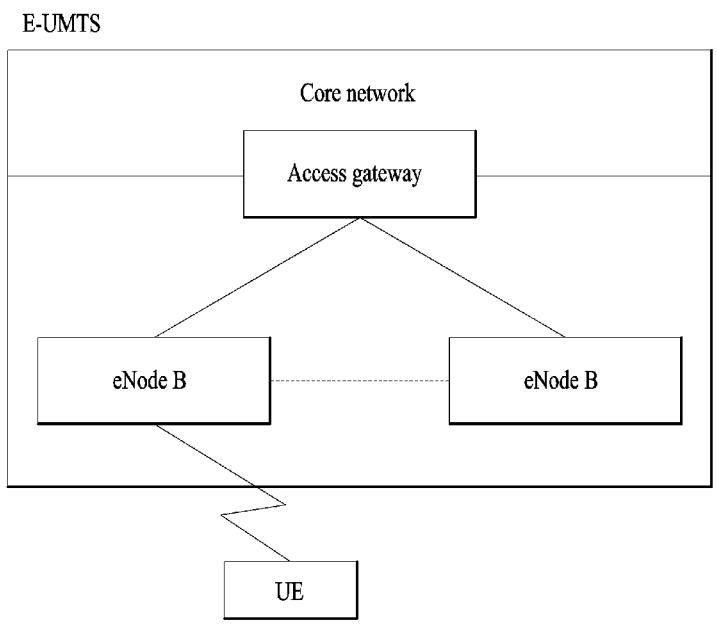
FIG. 1 is a schematic diagram of an E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
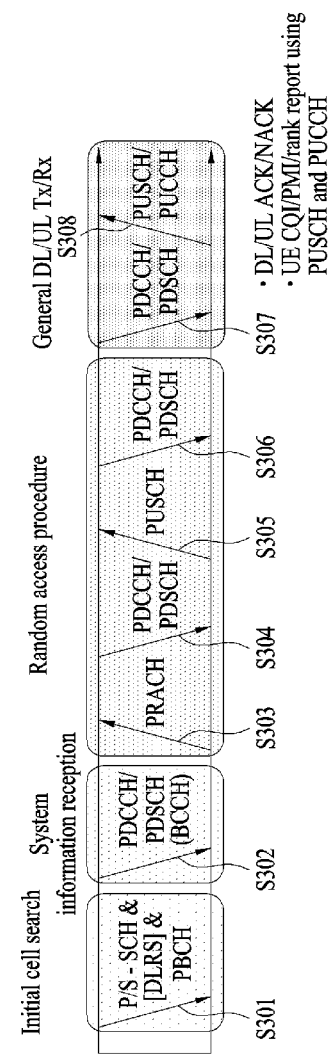
FIG. 3 illustrates physical channels used in the 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
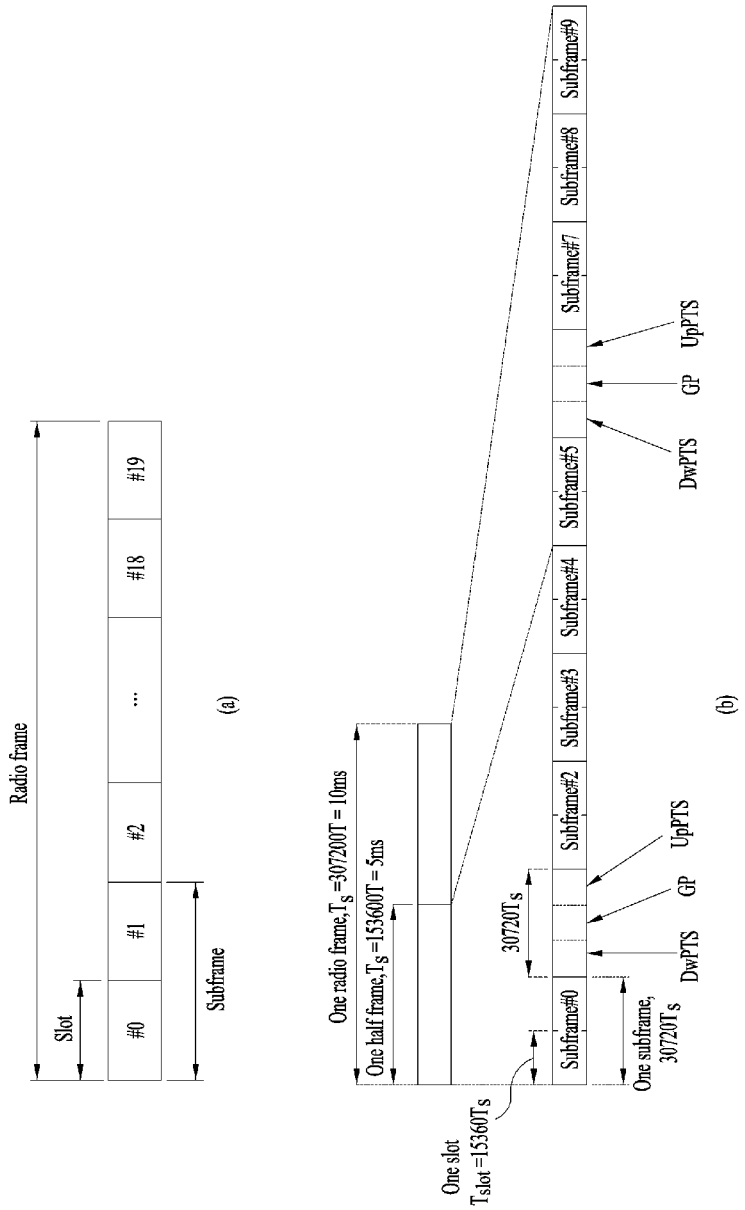
FIG. 4 illustrates a structure of a radio frame used in the LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| | | Normal cyclic prefix in downlink | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
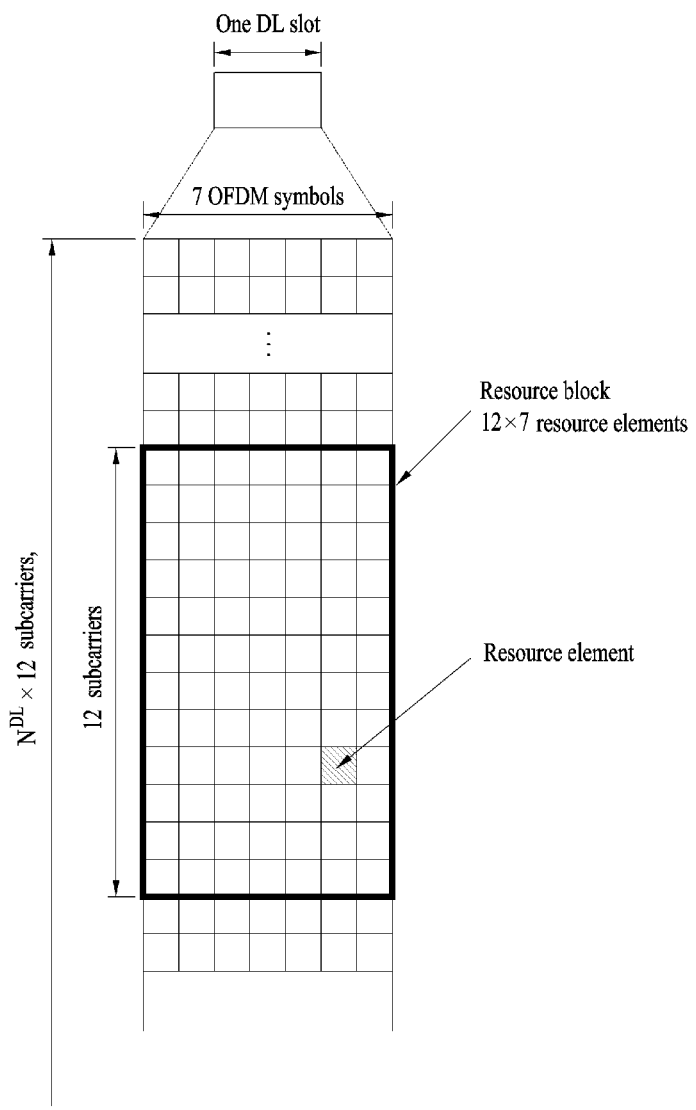
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
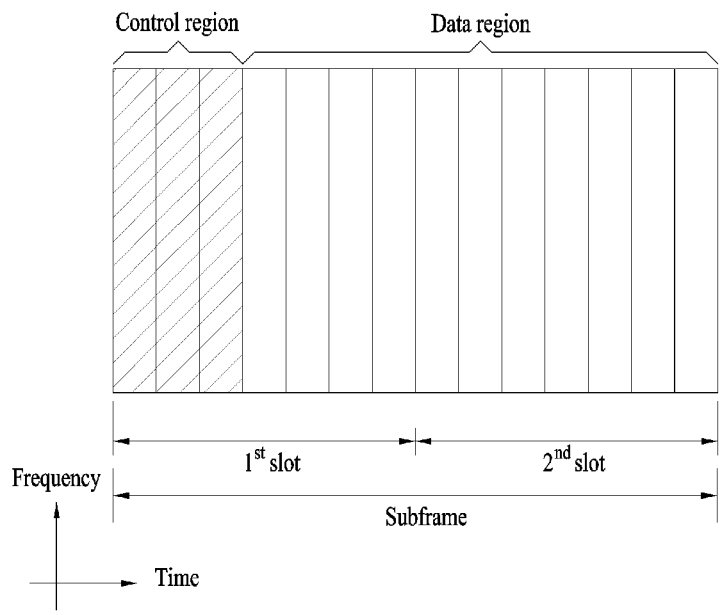
FIG. 6 illustrates a structure of a downlink radio frame used in the LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
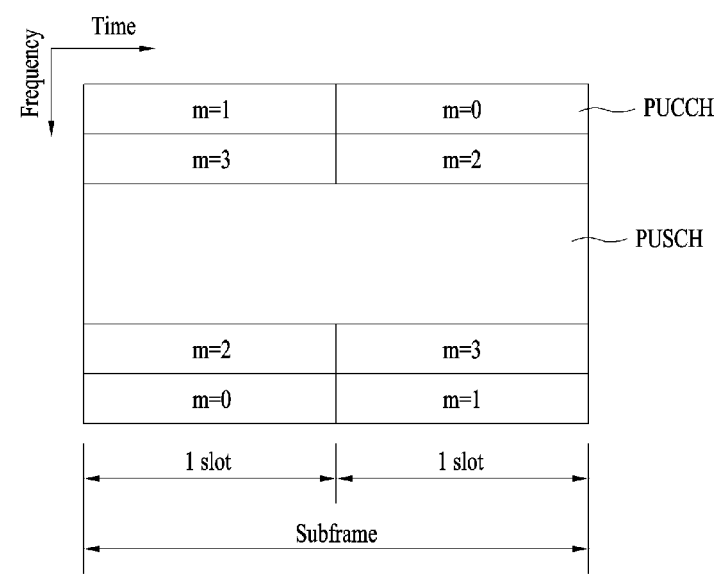
FIG. 7 illustrates a structure of an uplink subframe used in the LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

D2D communication schemes can be mainly divided into a scheme supported by a network/coordination station (e.g., base station) and a scheme not supported by the network/coordination station.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links and transceive data.

Based on the above-mentioned discussion, the present invention proposes a method for efficiently supporting wide area network (WAN) communication and device-to-device (D2D) communication in an environment where the WAN communication and the D2D communication coexist. Here, the D2D communication means that a UE directly communicates with another UE through a radio channel. In addition, although a UE means a user's terminal, a network entity such as an eNB may be regarded as the UE to which the present invention can be applied if the network entity transmits/receives signals according to a communication method between UEs. Moreover, the WAN communication means various types of the conventional communication performed between a UE and a cell (e.g., PUSCH, PUCCH, PDSCH, and the like).

In this specification, the term "HARQ-ACK" means information (e.g., ACK/NACK information) indicating whether a UE successfully receives DL data and/or control information transmitted from a cell. In addition, for convenience of description, a UE that performs D2D signal transmission operation is defined as "D2D TX UE" and a UE that performs D2D signal reception operation is defined as "D2D RX UE".

Moreover, it is defined that the term "configuration information" includes or at least means a DL HARQ timeline defined in a UL-DL configuration corresponding to the indicated configuration for convenience of description.

Furthermore, for convenience of description, the present invention is described based on the 3GPP LTE system. However, the present invention can be extensively applied to other systems as well as the 3GPP LTE system.

Furthermore, the embodiments of the present invention can be extensively applied to i) a case where among D2D UEs participating in D2D communication, some D2D UEs are within coverage of a network and the remaining D2D UEs are out of the coverage of the network (i.e., D2D Discovery/Communication of Partial Network Coverage), ii) a case where all D2D UEs participating in the D2D communication are within the coverage of the network (i.e., D2D Discovery/Communication Within Network Coverage), and/or iii) a case where all D2D UEs participating in the D2D communication are out of the coverage of the network (i.e., D2D Discovery/Communication Outside Network Coverage (for Public Safety Only)).

Before describing the present invention in detail, description will be given of resource configuration/allocation in D2D communication.

In general, when a UE directly communicates with another UE through a radio channel, the UE may select a resource unit (RU) corresponding to a specific resource in a resource pool corresponding to a set of contiguous resources and then transmit a D2D signal using the corresponding RU (D2D TX UE's operation). A D2D RX UE receives resource pool information, which can be used by the D2D TX UE for signal transmission, and then detects the signal from the D2D TX UE in the corresponding resource pool. In this case, the resource pool information may i) be indicated by a base station when the D2D TX UE is in coverage of the base station or ii) be indicated by another UE or determined as predetermined resources when the D2D TX UE is out of the coverage of the base station.

In general, a resource pool includes a plurality of RUs. In addition, each UE may select one or more RUs to transmit its D2D signal.

Figure 9:
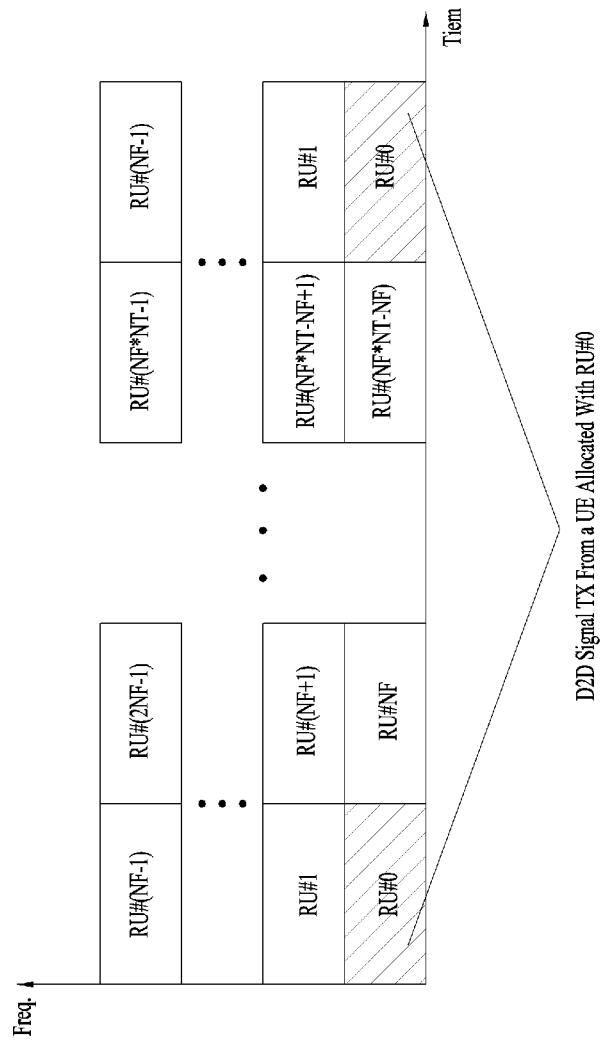
FIG. 9 illustrates a configuration of a resource unit (RU) for D2D communication.

FIG. 9 is a reference diagram for explaining an example of a resource unit (RU) configuration for D2D communication. All frequency resources are divided into NF resource units and all time resources are divided into NT resource units, thereby defining total (NF*NT) resource units. In this case, the resource pool is repeated with a period of NT subframes. As shown in FIG. 9, one specific resource unit may be repeated periodically. Alternatively, to obtain a diversity effect in a time dimension or frequency dimension, an index of a physical RU to which a single logical RU is mapped may be changed according to a time based on a predetermined pattern. Considering such a resource unit structure, the resource pool may mean a set of resource units that can be used by a UE intending to transmit a D2D signal in transmitting the D2D signal.

The aforementioned resource pool can be subdivided into several types. In particular, the resource pool may be classified according to a content of the D2D signal transmitted in each resource pool. For example, the content of the D2D signal can be classified as follows and a separate resource pool may be configured for each content.

Scheduling assignment (SA): The SA means a signal containing information such as a location of resources used by each D2D TX UE for transmitting a follow-up D2D data channel, MCS (modulation and coding scheme) necessary for demodulation of other data channels, or a MIMO transmission scheme. In addition, this signal may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the D2D TX UE for transmitting user data by utilizing the resources designated through the SA. In case the D2D data channel is multiplexed and transmitted with SA information on the same resource unit, only the D2D data channel except the SA information may be transmitted in the resource pool for the D2D data channel. In other words, resource elements (REs) used for transmitting the SA information on each resource unit in the SA resource pool may be used for transmitting the D2D data on the D2D data channel resource pool.

Discovery message: A discovery message resource pool may mean a resource pool for transmitting the discovery message. The D2D TX UE may transmit the discovery message containing information such as its ID for the purpose of enabling neighboring UEs to discover the corresponding D2D TX UE.

As described above, the D2D resource pool may be classified according to the content of the D2D signal. However, although D2D signals have the same content, different resource pools may be used according to transmitting/receiving properties of the D2D signals. For instance, even in the case of the same D2D data channel or discovery message, different resource pools may be used according to i) a scheme for determining transmission timing of a D2D signal (e.g., a scheme for transmitting a D2D signal at a reception time of a synchronization reference signal or a scheme for transmitting a D2D signal at a time obtained by applying timing advance to a reception time of a synchronization reference signal), ii) a scheme for allocating a resource (e.g., a scheme in which a cell designates a resource for transmitting each signal for each D2D TX UE or a scheme in which each D2D TX UE autonomously selects a resource for transmitting each signal from its pool), or iii) a signal format (e.g., the number of symbols occupied by each D2D signal in a single subframe or the number of subframes used for transmitting a single D2D signal).

In addition, a resource allocation method for D2D data channel transmission can be divided into the following two modes.

Mode 1: In mode 1, a cell directly designates a resource for transmitting SA and D2D data for each D2D TX UE. As a result, the cell can accurately grasp which UE uses which resource for D2D signal transmission. However, if the cell designates a D2D resource for every D2D signal, it may cause significant signaling overhead. Hence, the cell may allocate a plurality of SA transmission resources and/or data transmission resources through one-time signaling.

Mode 2: In mode 2, each D2D TX UE selects an appropriate resource from a series of resource pools associated with SA and data, which are configured by a cell for a plurality of D2D TX UEs, and then transmits SA and data. As a result, the cell cannot accurately grasp which UE uses which resource for D2D signal transmission.

Furthermore, a resource allocation method for discovery message transmission can be divided into two types.

TYPE 1: TYPE 1 corresponds to a discovery procedure where resources for discovery signal transmission are allocated on a non-UE-specific basis. In this case, the resources may be for all UEs or a group of UEs TYPE 2: TYPE 2 corresponds to a discovery procedure where resources for discovery signal transmission are allocated on a UE-specific basis.

TYPE 2A: Resources are allocated for each specific transmission instance of discovery signals.

TYPE 2B: Resources are semi-persistently allocated for discovery signal transmission.

Figure 10:
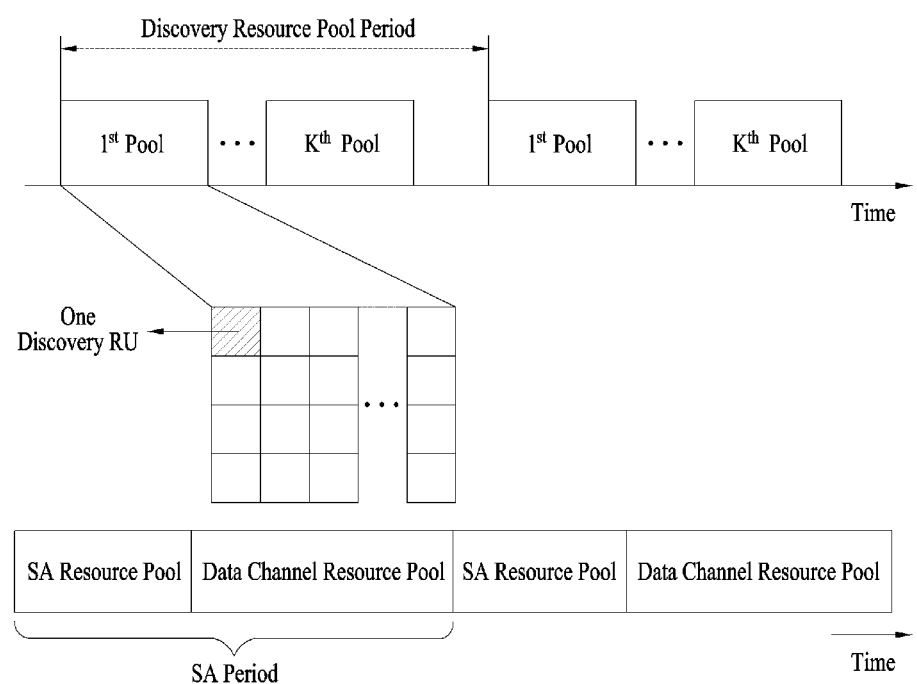
FIG. 10 illustrates a resource pool associated with a discovery message.

FIG. 10 illustrates a case in which a resource pool associated with a discovery message (hereinafter referred to as "discovery resource pool") periodically appears. In FIG. 10, a period at which the corresponding resource pool appears is named "discovery resource pool period". Moreover, in FIG. 10, among multiple discovery resource pools configured in (one) discovery resource pool period, specific discovery resource pool(s) may be defined as discovery transmission/reception resource pool(s) associated with a serving cell and other (remaining) discovery resource pool(s) may be defined as discovery reception resource pool(s) associated with a neighbor cell.

Generally, D2D communication is performed using UL resources that are used by a UE for UL transmission. In this case, if D2D signal transmission/reception operation and WAN signal transmission operation overlap with each other at least partially (i.e., partially or entirely) from the perspective of a D2D UE, the WAN signal transmission operation can be defined to have a higher priority (e.g., the D2D signal transmission/reception operation can be dropped). In this case, if there is no additional method/configuration/rule for efficient coexistence of D2D communication and WAN communication, it may cause the following problems: i) a problem that WAN signal transmission operation of D2D UE#Y causes severe interference to D2D signal reception operation of D2D UE#X, which overlaps at least partially (i.e., partially or entirely) with the WAN signal transmission operation of the D2D UE#Y (hereinafter referred to "problem #1"); ii) a problem that D2D signal transmission operation of the D2D UE#X causes (severe) interference to WAN signal reception operation performed by the D2D UE#Y, which overlaps at least partially (i.e., partially or entirely) with the D2D signal transmission operation of the D2D UE#X (hereinafter referred to "problem #2"), and iii) a problem that D2D signal transmission/reception operation of the D2D UE#X is dropped due to WAN signal transmission operation of the D2D UE#X, which overlaps at least partially (i.e., partially or entirely) with the D2D signal transmission/reception operation of the D2D UE#X (hereinafter referred to "problem #3"), whereby it is difficult to achieve stable performance/fulfillment/operation in the D2D communication and the WAN communication.

Figure 11:
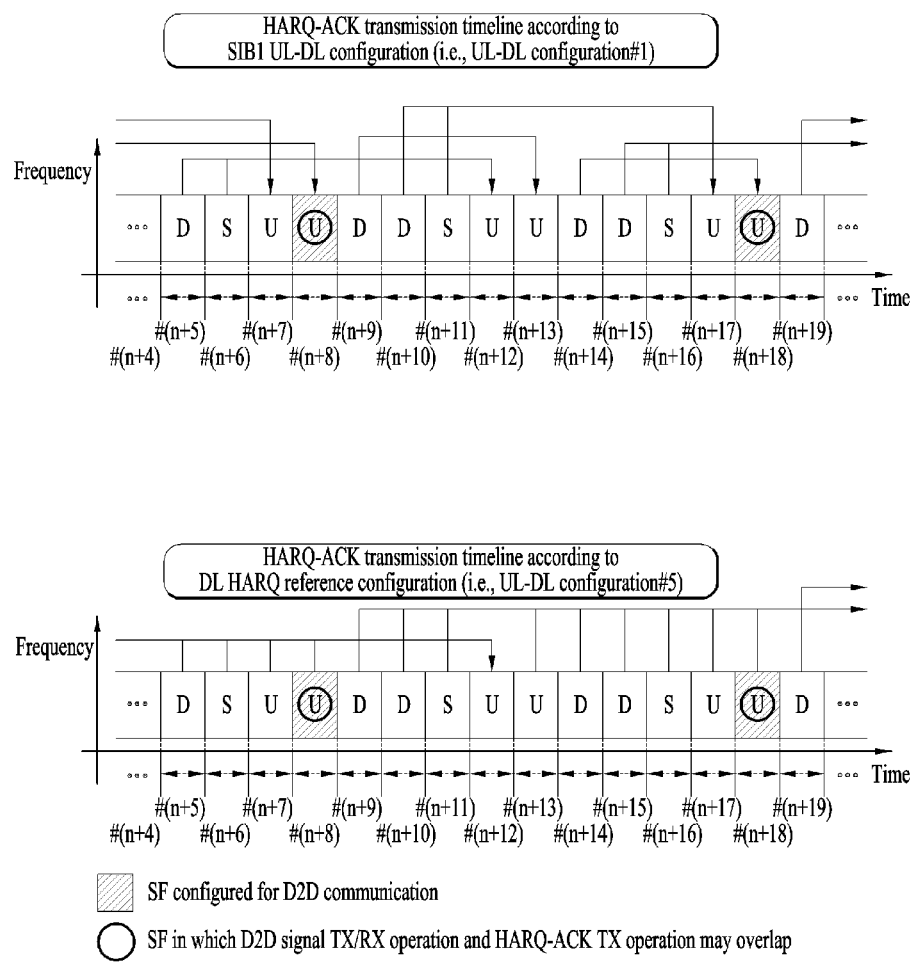
FIG. 11 illustrates a case in which DL HARQ reference configuration information for D2D communication and WAN communication is signaled to a D2D UE in a TDD system.

FIG. 11 illustrates a case in which for efficient coexistence of D2D communication and WAN communication, DL HARQ reference configuration information is signaled to a D2D UE in a TDD system. For example, it may be configured that one of i) UL-DL configuration informations including DL SFs in SIB1 (or RadioResourceConfigCommonSCell IE) UL-DL configuration information and/or ii) UL-DL configuration informations not including UL SFs in preconfigured or signaled D2D resource pool information is selected as the corresponding DL HARQ reference configuration information. In other words, it may be interpreted as that D2D communication is not performed on UL SFs in the corresponding DL HARQ reference configuration information.

In this case, if a D2D UE receives DL HARQ reference configuration information, which does not meet at least one (some or all) of conditions, among i) the UL-DL configuration informations including the DL SFs in the SIB1 (or RadioResourceConfigCommonSCell IE) UL-DL configuration information or ii) the UL-DL configuration informations not including the UL SFs in the preconfigured or signaled D2D resource pool information, the D2D UE may determine that the corresponding DL HARQ reference configuration information is not valid or is not received correctly. Thereafter, the D2D UE may be configured a) not to perform D2D communication operation or b) to perform the D2D communication operation by assuming predefined or signal UL-DL configuration information (e.g., SIB1 (or RadioResourceConfigCommonSCell IE) UL-DL configuration information) to be DL HARQ reference configuration information.

In addition, it may be configured that among the conventional seven UL-DL configuration (e.g., UL-DL configuration #0 to UL-DL configuration #6) informations, UL-DL configuration information that meets the aforementioned condition(s) is selected as the corresponding DL HARQ reference information. Alternatively, it may be configured that among predefined or signaled N UL-DL configuration informations, UL-DL configuration information that meets the aforementioned condition(s) is selected as the corresponding DL HARQ reference information. For instance, the (predefined or signaled) N UL-DL configuration informations may be one of i) UL-DL configuration informations including a relatively large number of DL SFs, ii) the UL-DL configuration informations including the DL SFs in the SIB1 (or RadioResourceConfigCommonSCell IE) UL-DL configuration information, and iii) the UL-DL configuration informations not including the UL SFs in the (pre-configured or signaled) D2D resource pool information.

Referring to FIG. 11, if the corresponding DL HARQ reference configuration information is signaled to a D2D UE, it is possible to mitigate the aforementioned problems, e.g., problem #1, problem #2, and problem #3 (i.e., problems occurring at SF#(N+8) and SF#(N+18)). This is because that HARQ-ACK transmission is shifted to a UL SF that is not configured for D2D communication (i.e., SF#(N+12)) by the DL HARQ reference configuration information (e.g., UL-DL configuration #5). In other words, it may be interpreted as that i) a problem that the D2D signal transmission/reception operation of the D2D UE#X is dropped due to HARQ-ACK (and/or PUSCH) transmission operation of the D2D UE#X, which overlaps at least partially (i.e., partially or entirely) with the D2D signal transmission/reception operation of the D2D UE#X, ii) a problem that HARQ-ACK (and/or PUSCH) transmission operation of the D2D UE#Y causes (severe) interference to the D2D signal reception operation of D2D UE#X, which overlaps at least partially (i.e., partially or entirely) with the HARQ-ACK (and/or PUSCH) transmission operation of the D2D UE#Y, or iii) a problem that the D2D signal transmission operation of the D2D UE#X causes (severe) interference to HARQ-ACK (and/or PUSCH) reception operation performed by the D2D UE#Y, which overlaps at least partially (i.e., partially or entirely) with the D2D signal transmission operation of the D2D UE#X is mitigated.

In case DL HARQ reference configuration information for solving the aforementioned problems is configured or signaled, it is possible to define parameters associated with HARQ operation according to at least one (some or all) of the following methods #1 to #3. Further, it may be configured that at least one (some or all) of the methods #1 to #3 is limitedly applied only to the TDD system.

Method #1

According to the present invention, an HARQ-ACK bit size (or HARQ-ACK codebook size) transmitted in specific UL SF#K may be configured as described in the following example #1-1 or #1-2.

Example #1-1

It may be configured that the HARQ-ACK bit size/HARQ-ACK codebook size/(new) bundling window size M associated with the specific UL SF#K, which is transmitted in the specific UL SF#K, is determined as follows. First, among DL SFs interconnected with the corresponding specific UL SF#K based on the DL HARQ reference configuration information, only DL SFs configured as DL SFs even in the SIB1 (or RadioResourceConfigCommonSCell IE) UL-DL configuration information are regarded as valid DL SFs. Thereafter, (the number of) only the corresponding valid DL SFs are considered to determine the HARQ-ACK bit size/HARQ-ACK codebook size/(new) bundling window size M associated with the specific UL SF#K.

For instance, in FIG. 11, if a method described in the example #1-1 is applied, an HARQ-ACK bit size/HARQ-ACK codebook size/(new) bundling window size M associated with SF#(N+22), which is transmitted in the SF#(N+22), is determined by considering only SF#(N+9), SF#(N+10), SF#(N+11), SF#(N+14), SF#(N+15), and SF#(N+16). That is, SFs designated as UL SFs in the SIB1 (or RadioResourceConfigCommonSCell IE) UL-DL configuration information (e.g., SF#(N+13), SF#(N+17), and SF#(N+18)) are excluded.

According to the method described in the example #1-1, among DL SFs in the DL HARQ reference configuration information, SFs actually used as only UL SFs (in the SIB1 (or RadioResourceConfigCommonSCell IE) UL-DL configuration information) are excluded in determination of the HARQ-ACK bit size/HARQ-ACK codebook size/(new) bundling window size M, whereby the HARQ-ACK bit size/HARQ-ACK codebook size/(new) bundling window size M can be efficiently determined.

Example #1-2

It may be configured that the HARQ-ACK bit size/HARQ-ACK codebook size/(new) bundling window size M associated with the specific UL SF#K, which is transmitted in the specific UL SF#K, is determined by considering (the number of) DL SFs associated with the corresponding specific UL SF#K based on the DL HARQ reference configuration information.

For instance, in FIG. 11, if a method described in the example #1-2 is applied, the HARQ-ACK bit size/HARQ-ACK codebook size/(new) bundling window size M associated with the SF#(N+22), which is transmitted in the SF#(N+22), is determined by considering only SF#(N+9), SF#(N+10), SF#(N+11), SF#(N+13), SF#(N+14), SF#(N+15), SF#(N+16), SF#(N+17), and SF#(N+18).

Method #2

According to the present invention, a PUCCH resource associated with an HARQ-ACK transmitted in the specific UL SF#K may be configured as described in the following example #2-1 or #2-2.

Example #2-1

It may be configured that the PUCCH resource associated with the HARQ-ACK transmitted in the specific UL SF#K is determined as follows. First, among DL SFs interconnected with the corresponding specific UL SF#K based on the DL HARQ reference configuration information, only DL SFs configured as DL SFs even in the SIB1 (or RadioResourceConfigCommonSCell IE) UL-DL configuration information are regarded as valid DL SFs. Thereafter, in consideration of (the number of) the corresponding valid DL SFs, an implicit PUCCH resource is configured/reserved/stacked.

If a method described in the example #2-1 is applied, among the DL SFs in the DL HARQ reference configuration information, the SFs actually used as only UL SFs in the SIB1 (or RadioResourceConfigCommonSCell IE) UL-DL configuration information are excluded in configuration/ reservation of PUCCH resources, whereby the (implicit) PUCCH resource can be efficiently configured/reserved/stacked.

Example #2-2

The PUCCH resource associated with the HARQ-ACK transmitted in the specific UL SF#K may be configured such that the (implicit) PUCCH resource is configured/reserved/stacked in consideration of (the number of) the DL SFs interconnected with the corresponding specific UL SF#K based on the DL HARQ reference configuration information.

Method #3

According to the present invention, a maximum number of DL HARQ processes (associated with soft buffer division operation) may be configured as described in the following example #3-1 or #3-2.

Example #3-1

It can be defined that the maximum number of the DL HARQ processes (associated with the soft buffer division operation) is derived based on the SIB1 (or RadioResource-ConfigCommonSCell IE) UL-DL configuration information rather than the DL HARQ reference configuration information.

By applying a method described in the example #3-1, the soft buffer division operation may be performed based on one of i) the derived maximum number of the DL HARQ processes and ii) a smaller one of the derived maximum number of the DL HARQ processes and 8.

Example #3-2

It can be defined that the maximum number of the DL HARQ processes (associated with the soft buffer division operation) is derived based on the aforementioned DL HARQ reference configuration information. In this case, by applying a method mentioned in the example #3-2, the soft buffer division operation may be performed based on one of i) the derived maximum number of the DL HARQ processes and ii) a smaller one of the derived maximum number of the DL HARQ processes and 8.

In addition, according to another embodiment of the present invention, it may be configured that the corresponding DL HARQ reference configuration information is applied only to a radio frame including a subframe configured for D2D communication (hereinafter referred to as radio frame#Q), F radio frames located in front of the radio frame#Q, and B radio frames located in back of the radio frame#Q. In this case, values of F and B may include "0" or be assumed to be "0". In addition, they may be defined to be equal to or different from each other. Further, the values of F and B may be predefined or signaled from a cell/another D2D UE.

As another example, it may be configured that in radio frames except radio frames to which the DL HARQ reference configuration information is applied, HARQ operation is performed according to i) the SIB1 (or RadioResource-ConfigCommonSCell IE) UL-DL configuration information or ii) predefined or signaled UL-DL configuration information.

Figure 12:
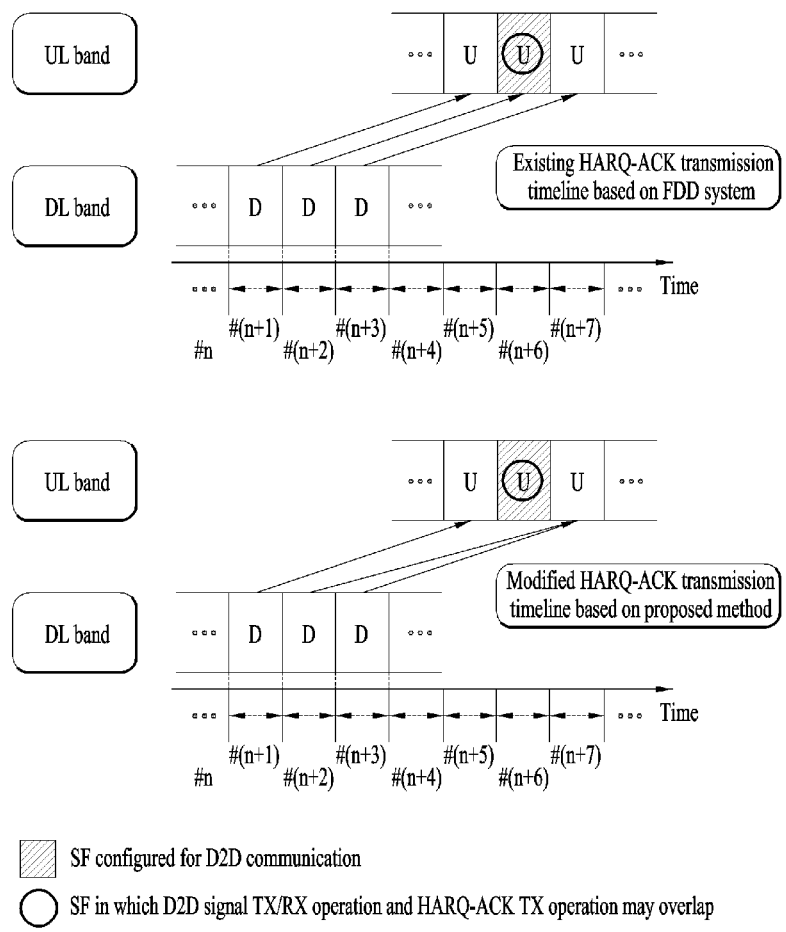
FIG. 12 illustrates a case in which a predefined or signaled subframe bundling scheme (or codeword bundling scheme) is applied for D2D communication and WAN communication in an FDD system.

FIG. 12 illustrates a case in which a predefined or signaled subframe bundling scheme (or codeword bundling scheme) is applied for coexistence of D2D communication and WAN communication in an FDD system.

Referring to FIG. 12, if the subframe bundling scheme (or codeword bundling scheme) is applied, similar to the case shown in FIG. 11, HARQ-ACK transmission in an SF configured for D2D communication (e.g., SF#(N+6)) may be shifted (and/or bundled with) to a closest UL SF that is not configured for the D2D communication (e.g., SF#(N+7)). Here, as a result obtained by performing logical AND operation on ACK/NACK responses corresponding to a plurality of subframes (or codewords) in a given (time) window, "bundling" may mean operation of determining final HARQ-ACK feedback.

If the subframe bundling scheme (or codeword bundling scheme) is applied as shown in FIG. 12, a D2D UE may be configured to assume methods #4 and #5 below. In this case, at least one (some or all) of rules, which will be described in the methods #4 and #5, may be limitedly applied only when the aforementioned new subframe bundling scheme (or codeword bundling scheme) is enabled through a predefined signal (e.g., physical layer signal or higher layer signal).

Method #4

According to the present invention, it may be configured that if a PDSCH (and/or a PDCCH for scheduling the PDSCH) is not received in the last DL SF in terms of SF timing (i.e., time sequence) among DL SFs corresponding to a bundling window (which is predefined, signaled or implicitly determined based on a predefined rule), an HARQ-ACK associated with reception of the PDSCH in the corresponding bundling window is not eventually transmitted.

The reason for application of the present method is that if the PDSCH (and/or the PDCCH for scheduling the PDSCH) is not received in the last DL SF in the bundling window, a PUCCH resource (for the HARQ-ACK) associated with the corresponding bundling window may not be determined. That is, the PUCCH resource (for the HARQ-ACK) associated with the bundling window is determined based on a PDCCH resource (e.g., lowest (E)CCE index) (associated with PDSCH scheduling), which is received in the last DL SF in the bundling window.

In addition, the method #4 may be limitedly applied only when a DL DAI field and/or an ARI field are not newly defined for such a subframe bundling scheme (or codeword bundling scheme). For instance, in case the method #4 is applied to the case shown in FIG. 12, if a D2D UE fails to receive a PDSCH (and/or a PDCCH for scheduling the PDSCH) in DL SF#(N+3), the D2D UE may not (eventually) transmit an HARQ-ACK associated with a bundling window (here, the corresponding bundling window is configured with DL SF#(N+2) and the DL SF#(N+3)) even though the D2D UE successfully receives the PDSCH (and/or the PDCCH for scheduling the PDSCH) in the DL SF#(N+2) (i.e., in the case of the ACK).

Method #5

According to the present invention, DL HARQ reference configuration information (see FIG. 11) may be signaled to a D2D UE for efficient coexistence of D2D communication and WAN communication in the FDD system.

In addition, if the method #5 is applied, at least one (some or all) of the following rules #5-1 to #5-5 may be configured.

Rule #5-1

To avoid a DL scheduling restriction on DL SF#N of which a location matches that of UL SF#N in a DL HARQ reference UL-DL configuration, it can be defined that ACK/NACK information associated with DL data (i.e., PDSCH) received in the corresponding DL SF#N exceptionally complies with i) existing FDD DL HARQ timing (e.g., SF#(N+4)) rather than DL HARQ timing based on the DL HARQ reference UL-DL configuration or ii) predefined additional DL HARQ timing (e.g., SF#(N+K)).

In this case, in control information (i.e., PDCCH) associated with DL data scheduling in the DL SF#N, DL DAI field information may be configured to be i) omitted or ii) set to a predefined specific value (e.g., 0) (for example, it may be configured to be used for virtual CRC), exceptionally.

Rule #5-2

When the rule #5-1 in accordance with the present invention is applied, it can be defined that a D2D resource pool is configured in consideration of only the remaining UL SFs except i) a UL SF (e.g., UL SF#M) and/or ii) a UL SF (e.g., SF#(M+4)) in which ACK/NACK information associated with DL SF#M of which a location matches that of the corresponding UL SF#M in the DL HARQ reference UL-DL configuration.

Rule #5-3

As an example of the present invention, if a period associated with the D2D resource pool is set to be relatively large or be greater than a preconfigured threshold, it may be configured that TDM is applied to existing FDD HARQ timing and timing based on the DL HARQ reference UL-DL configuration on a radio frame basis according to a preconfigured or signaled rule.

Specifically, it may be configured that DL HARQ reference configuration information is applied only to a radio frame including a subframe configured for D2D communication (hereinafter referred to as radio frame#Q), F radio frames located in front of the radio frame#Q, and B radio frames located in back of the radio frame#Q. In this case, values of F and B may include "0" or be assumed to be "0". In addition, they may be defined to be equal to or different from each other. Further, the values of F and B may be predefined or signaled from a cell/another D2D UE.

When the rule #5-3 is applied, it can be defined that the DL DAI field is limitedly present only for SFs to which the timing based on the DL HARQ reference UL-DL configuration is applied. In other words, in SFs to which the existing FDD HARQ timing is applied, the DL DAI field information may be configured to be omitted or set to the predefined specific value (e.g., 0) (for example, it may be configured to be used for virtual CRC), exceptionally.

Rule #5-4

According to the present invention, when the DL HARQ reference UL-DL configuration is applied, unlike the conventional FDD system, it may be configured that the DL DAI (downlink assignment index) field exists in a PDCCH associated with PDSCH scheduling, which is transmitted in a UE-specific search space (USS), and the DL DAI field does not exist in a PDCCH associated with PDSCH scheduling, which is transmitted in a common search space (CSS). That is, it is possible to prevent increase in the number of times of additional PDCCH blinding decoding in the CSS and assume a PDCCH field configuration/size equal to that of a legacy FDD UE.

Alternatively, when the DL HARQ reference UL-DL configuration is applied, unlike the conventional FDD system, it may be configured that the DL DAI field exists in both of the PDCCH associated with the PDSCH scheduling, which is transmitted in the USS, and the PDCCH associated with the PDSCH scheduling, which is transmitted in the CSS.

Rule #5-5

According to the present invention, when the DL HARQ reference UL-DL configuration is applied, it may be configured that instead of HARQ-ACK bit ordering based on the corresponding DL HARQ reference UL-DL configuration (i.e., DL HARQ timing), HARQ-ACK bit ordering based on subframe indices is applied.

Specifically, in case the DL HARQ reference UL-DL configuration is applied, if HARQ-ACK information associated with PDSCH reception in DL SF#(N-K1), DL SF#(N-K2), and DL SF#(N-K3) (where K1>K2>K3 and K1, K2, and K3 are integers greater than 0) is transmitted in UL SF#N, the HARQ-ACK bit ordering may be configured in an order of "DL SF#(N-K1)?DL SF#(N-K2)?DL SF#(N-K3)" (i.e., ascending order of subframe indices).

Each of the aforementioned embodiments/configurations/rules/examples of the present invention can be embodied independently. And, it is possible to implement each of the aforementioned embodiments not only independently but also by combining (or merging) at least one of the embodiments.

In addition, the aforementioned embodiments of the present invention can be extensively applied to i) a case where among D2D UEs participating in D2D communication, some D2D UEs are within coverage of a network and the remaining D2D UEs are out of the coverage of the network (i.e., D2D Discovery/Communication of Partial Network Coverage), ii) a case where all D2D UEs participating in the D2D communication are within the coverage of the network (i.e., D2D Discovery/Communication Within Network Coverage), and/or iii) a case where all D2D UEs participating in the D2D communication are out of the coverage of the network (i.e., D2D Discovery/Communication Outside Network Coverage (for Public Safety Only)).

Furthermore, the aforementioned embodiments of the present invention can be extensively applied not only to TYPE 1 discovery message transmission and/or Mode 2 D2D data channel transmission but also to SA transmission. Further, the aforementioned embodiments of the present invention may be configured to be limitedly applied only to discovery message transmission/D2D data channel transmission/SA transmission.

Further, the aforementioned embodiments of the present invention may be configured to be limitedly applied only to transmission of a specific type of a discovery message/transmission of a specific mode of a D2D data channel. Additionally, the present invention may be configured to be limitedly applied only to D2D communication associated with Partial Network Coverage/Within Network Coverage/Outside Network Coverage.

Further, the DL HARQ reference configuration information, which is used for efficient coexistence of D2D communication and WAN communication, according to the present invention may be DL HARQ reference configuration information predefined in 3GPP LTE standards and, even in this case, the embodiments of the present invention can be extensively applied.

Figure 13:
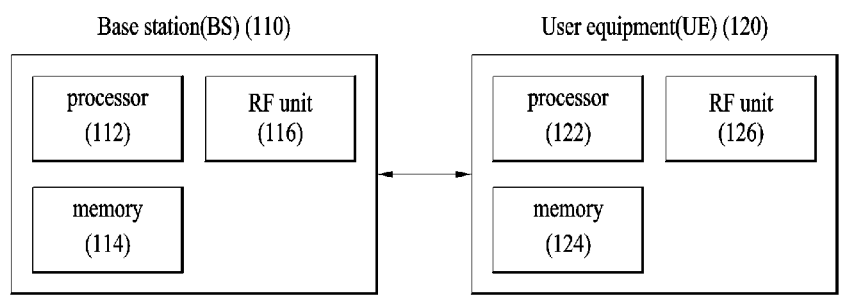
FIG. 13 illustrates a base station and a user equipment applicable to one embodiment of the present invention.

FIG. 13 is a diagram of a base station and a user equipment applicable to one embodiment of the present invention.

If a relay node is included in a wireless communication system, communication in a backhaul link is performed between a base station and the relay node and communication in an access link is performed between the relay node and a user equipment. Therefore, the base station or user equipment shown in the drawing can be substituted with the relay node in some cases.

Referring to FIG. 13, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for supporting device-to-device (D2D) communication in a wireless communication system and apparatus therefor are mainly described with reference to examples applied to 3GPP LTE system, the method and apparatus can be applied to various kinds of wireless communication systems as well as the 3GPP LTE system.

What is claimed is:

1. A method for transmitting, by a device-to-device (D2D) user equipment (UE), a hybrid automatic repeat request acknowledgement/negative-acknowledgement (HARQ-ACK/NACK) for a wide area network (WAN) in a wireless communication system based on time division duplex (TDD), the method comprising:
   receiving information related to a resource pool for transmitting a D2D signal;
   receiving first downlink HARQ reference configurations for WAN communication; and
   transmitting the HARQ-ACK/NACK based on a second downlink HARQ reference configuration,
   wherein the second downlink HARQ reference configuration is selected from among the first downlink HARQ reference configurations, and
   wherein an uplink subframe of the second downlink HARQ reference configuration is not overlapped with subframes of the resource pool.

2. The method of claim 1, wherein a bit size of the HARQ-ACK/NACK is determined based on a number of valid downlink subframes determined by the second downlink HARQ reference configuration and an uplink-downlink configuration based on a system information block (SIB), and
   wherein the valid downlink subframes are subframes configured as downlink subframes in both of the second downlink HARQ reference configuration and the uplink-downlink configuration based on the SIB.

3. The method of claim 1, wherein a physical uplink control channel (PUCCH) resource for the HARQ-ACK/NACK is determined based on a number of valid downlink subframes determined by the second downlink HARQ reference configuration and an uplink-downlink configuration based on a system information block (SIB), and wherein the valid downlink subframes are subframes configured as downlink subframes in both of the second downlink HARQ reference configuration and the uplink-downlink configuration based on the SIB.

4. A method for feeding back, by a device-to-device (D2D) user equipment (UE), a hybrid automatic repeat request acknowledgement/negative-acknowledgement (HARQ-ACK/NACK) for a wide area network (WAN) in a wireless communication system based on frequency division duplex (FDD), the method and comprising:
  receiving a signal enabling subframe bundling; and
  performing bundling of an HARQ-ACK/NACK in a first uplink subframe for D2D communication and an HARQ-ACK/NACK in a second uplink subframe for WAN communication,
  wherein transmission of the bundled HARQ-ACK/NACK is determined based on whether a downlink signal is received on a last downlink subframe of a predetermined bundling window.

5. A method for feeding back, by a device-to-device (D2D) user equipment (UE), a hybrid automatic repeat request acknowledgement/negative-acknowledgement (HARQ-ACK/NACK) for a wide area network (WAN) in a wireless communication system based on frequency division duplex (FDD), the method comprising:
  receiving a downlink HARQ reference configuration based on time division duplex (TDD); and
  transmitting, when a downlink subframe for FDD and an uplink subframe for the downlink HARQ reference configuration are overlapped, a HARQ-ACK/NACK feedback based on FDD downlink HARQ timing for the downlink subframe for FDD,
  wherein the downlink subframe is set up for receiving physical downlink control channel (PDCCH) in which Downlink Assignment Index information is excepted.

6. The method of claim 5, wherein a resource pool for D2D communication is configured with only uplink subframes that match the FDD downlink HARQ timing among uplink subframes in the downlink HARQ reference configuration based on the TDD.

7. The method of claim 6, wherein on the resource pool for the D2D communication, time division multiplexing (TDM) of HARQ timing based on the downlink HARQ reference configuration based on the TDD and the FDD downlink HARQ timing is configured to be performed.

8. A device-to-device (D2D) user equipment (UE) for performing hybrid automatic repeat request acknowledgement/negative-acknowledgement (HARQ-ACK/NACK) transmission based on a wide area network (WAN) in a wireless communication system based on time division duplex (TDD), the D2D UE comprising:
  a transmitter and a receiver; and
  a processor, operatively coupled to the transmitter and the receiver,
  wherein the processor is configured to:
    receive information related to a resource pool for transmitting a D2D signal and first downlink HARQ reference configurations for WAN communication, and
    transmit an HARQ-ACK/NACK based on a second downlink HARQ reference configuration,
    wherein the second downlink HARQ reference configuration is selected from among the first downlink HARQ reference configurations, and
    wherein an uplink subframe of the second downlink HARQ reference configuration is not overlapped with subframes of the resource pool.

9. A device-to-device (D2D) user equipment (UE) for performing hybrid automatic repeat request acknowledgement/negative-acknowledgement (HARQ-ACK/NACK) feedback based on a wide area network (WAN) in a wireless communication system based on frequency division duplex (FDD), the D2D UE comprising:
  a transmitter and a receiver; and
  a processor, operatively coupled to the transmitter and the receiver,
  wherein the processor is configured to:
    receive a downlink HARQ reference configuration based on time division duplex (TDD), and
    transmit, when a downlink subframe for FDD and an uplink subframe for the downlink HARQ reference configuration are overlapped, a HARQ-ACK/NACK feedback based on FDD downlink HARQ timing for the downlink subframe for FDD, and
    wherein the downlink subframe is set up receiving physical downlink control channel (PDCCH) in which Downlink Assignment Index information is excepted.

* * * * *